United States Patent
Qian

(10) Patent No.: US 12,420,622 B2
(45) Date of Patent: Sep. 23, 2025

(54) CELL-TO-BODY STRUCTURE AND VEHICLE

(71) Applicant: Xiaomi EV Technology Co., Ltd., Beijing (CN)

(72) Inventor: Jiachun Qian, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 490 days.

(21) Appl. No.: 17/895,457

(22) Filed: Aug. 25, 2022

(65) Prior Publication Data

US 2023/0406084 A1    Dec. 21, 2023

(30) Foreign Application Priority Data

May 19, 2022 (CN) .......................... 202210558129.9

(51) Int. Cl.
*B60K 1/04* (2019.01)
*B62D 21/15* (2006.01)
*B62D 25/20* (2006.01)
*B62D 27/02* (2006.01)

(52) U.S. Cl.
CPC .............. *B60K 1/04* (2013.01); *B62D 21/152* (2013.01); *B62D 25/20* (2013.01); *B62D 27/023* (2013.01); *B60K 2001/0438* (2013.01)

(58) Field of Classification Search
CPC .. B62D 21/152; B62D 21/155; B62D 21/157; B62D 25/025; B62D 25/20; B62D 25/2036; B60K 2001/0422; B60K 2001/0433; B60K 2001/0438
See application file for complete search history.

(56) References Cited

U.S. PATENT DOCUMENTS

| | | | |
|---|---|---|---|
| 9,926,017 B1* | 3/2018 | Hamilton | B62D 25/20 |
| 11,628,714 B2* | 4/2023 | Caliskan | B60K 1/04 |
| | | | 180/68.5 |
| 2013/0088045 A1* | 4/2013 | Charbonneau | B62D 25/2036 |
| | | | 296/187.12 |

(Continued)

FOREIGN PATENT DOCUMENTS

| | | |
|---|---|---|
| CN | 112744063 A | 5/2021 |
| CN | 112793668 A | 5/2021 |

(Continued)

OTHER PUBLICATIONS

Extended European Search Report issued on May 22, 2023 for European Patent Application No. 22193270.0.

*Primary Examiner* — Gregory A Blankenship
(74) *Attorney, Agent, or Firm* — Volpe Koenig

(57) ABSTRACT

A cell-to-body structure includes a vehicle body and a power cell pack, where the vehicle body includes two sill beams, the two sill beams being arranged in a spaced manner in a left-right direction of a vehicle, and a cell pack mounting portion is on each of the sill beams; and the power cell pack includes a cell pack case, the cell pack case including a case body and a cross beam, the case body being connected to the cell pack mounting portion, the cross beam extending in the left-right direction, being located between the two sill beams, being integrated at a top of the case body and being connected to the vehicle body, and the top of the case body being used as a floor panel of the vehicle.

18 Claims, 8 Drawing Sheets

(56) References Cited

U.S. PATENT DOCUMENTS

| | | | | |
|---|---|---|---|---|
| 2013/0153317 | A1* | 6/2013 | Rawlinson | F41H 7/042 |
| | | | | 180/68.5 |
| 2014/0338999 | A1* | 11/2014 | Fujii | B60L 58/26 |
| | | | | 180/68.5 |
| 2016/0257346 | A1* | 9/2016 | Wu | B60K 1/04 |
| 2016/0375750 | A1* | 12/2016 | Hokazono | B62D 25/2036 |
| | | | | 180/68.5 |
| 2017/0225587 | A1* | 8/2017 | Newman | B60L 53/65 |
| 2018/0236863 | A1* | 8/2018 | Kawabe | B60K 1/04 |
| 2018/0312197 | A1* | 11/2018 | Takahashi | B62D 25/2036 |
| 2018/0312199 | A1* | 11/2018 | Kawase | B60K 1/04 |
| 2018/0345778 | A1* | 12/2018 | Yamanaka | B60K 1/04 |
| 2018/0361874 | A1* | 12/2018 | Kobayashi | H01M 50/227 |
| 2018/0370570 | A1* | 12/2018 | Ayukawa | B62D 25/2018 |
| 2019/0009662 | A1* | 1/2019 | Toyota | B60L 50/64 |
| 2019/0023323 | A1* | 1/2019 | Uehata | B62D 25/025 |
| 2019/0100090 | A1* | 4/2019 | Matecki | H01M 50/204 |
| 2019/0237720 | A1* | 8/2019 | Lucchesi | H01M 50/224 |
| 2020/0140021 | A1* | 5/2020 | Grottke | B62D 25/025 |
| 2020/0231222 | A1 | 7/2020 | Ahn et al. | |
| 2021/0039488 | A1* | 2/2021 | Ryu | B60K 6/28 |
| 2021/0221436 | A1* | 7/2021 | Tsuyuzaki | B62D 25/025 |
| 2022/0001935 | A1* | 1/2022 | Klamser | B62D 25/2036 |
| 2023/0406084 | A1* | 12/2023 | Qian | B62D 25/20 |
| 2024/0297384 | A1* | 9/2024 | Zhang | H01M 50/242 |
| 2024/0308322 | A1* | 9/2024 | Harsch | B60H 1/143 |
| 2024/0326920 | A1* | 10/2024 | Sun | B62D 25/2036 |
| 2024/0367499 | A1* | 11/2024 | Lian | B62D 25/025 |
| 2024/0367726 | A1* | 11/2024 | Lian | B60K 1/04 |

FOREIGN PATENT DOCUMENTS

| | | |
|---|---|---|
| CN | 113602364 A | 11/2021 |
| CN | 215622297 U | 1/2022 |
| CN | 114083972 A | 2/2022 |
| DE | 102019006812 A1 | 4/2021 |
| JP | 2018188086 A | 11/2018 |
| WO | 2020/193076 A1 | 10/2020 |

* cited by examiner

CELL-TO-BODY STRUCTURE AND VEHICLE

CROSS REFERENCE TO RELATED APPLICATION

The present application claims the benefit of priority to Chinese Application No. 202210558129.9, filed on May 19, 2022, the contents of which are incorporated herein by reference in their entireties for all purposes.

BACKGROUND

With the increasingly greater proportion of electric vehicles in the vehicle market, consumers have increasingly higher requirements for electric vehicles. The endurance of electric vehicles is a critical reference index when consumers select electric vehicles. How to improve the endurance of electric vehicles is a common problem in the field of vehicles.

SUMMARY

The objective of the disclosure is to provide a cell-to-body structure and a vehicle, so as to solve the technical problem in the related art.

In order to achieve the above objective, a first aspect of the disclosure provides a cell-to-body structure. The cell-to-body structure includes:
  a vehicle body, which includes two sill beams, the two sill beams being arranged in a spaced manner in a left-right direction of a vehicle, and a cell pack mounting portion being arranged on each of the sill beams; and
  a power cell pack, which includes a cell pack case, the cell pack case including a case body and a cross beam, the case body being connected to the cell pack mounting portion, the cross beam extending in the left-right direction, being located between the two sill beams, being integrated at a top of the case body and being connected to the vehicle body, and the top of the case body being used as a floor panel of the vehicle.

A second aspect of the disclosure provides a vehicle. The vehicle includes the cell-to-body structure described in the first aspect.

Other features and advantages of the disclosure will be described in detail in the following detailed description.

BRIEF DESCRIPTION OF THE DRAWINGS

The drawings, which are used for providing further understanding of the disclosure and constitute part of the description, together with the following detailed description, serve to explain the disclosure instead of limiting same. In the drawings.

DETAILED DESCRIPTION

Figure 1:
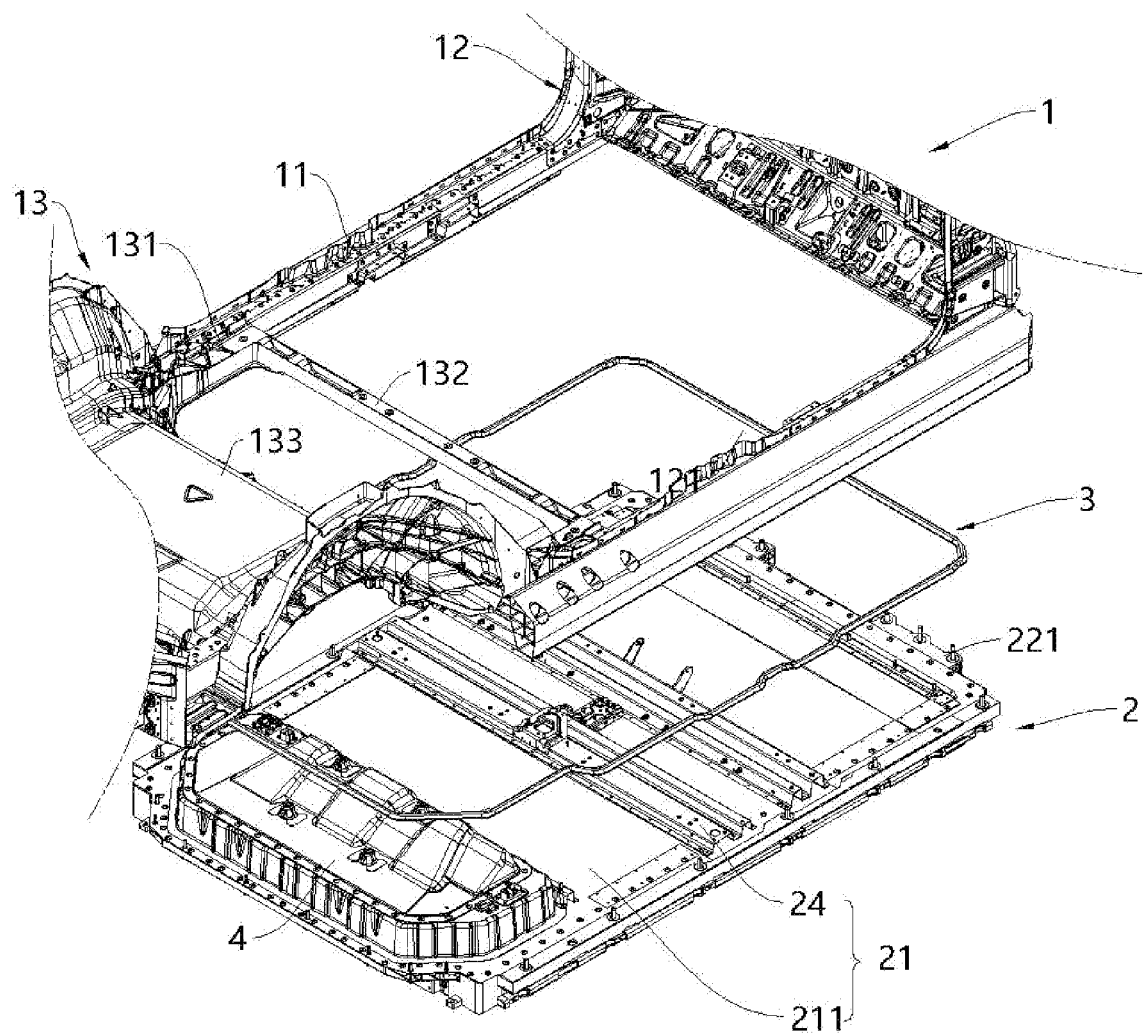
FIG. 1 is a partial exploded view of a cell-to-body structure in accordance with an embodiment of the disclosure.

The specific implementation of the disclosure is described in detail below in combination with the drawings. It should be understood that the specific implementation described herein is merely illustrative of the disclosure and is not intended to limit the disclosure.

In the disclosure, in the absence of any indication to the contrary, location words used, such as "top, bottom, upper, lower, left, right, front and rear", are all defined on the basis of top, bottom, upper, lower, left, right, front and rear in a normal driving state of a vehicle. Specifically, directions pointing to a vehicle ceiling are top and upper, directions pointing to a vehicle chassis are bottom and lower, a direction pointing to a left wheel of the vehicle is left, a direction pointing to a right wheel of the vehicle is right, a direction pointing to a vehicle head is front, and a direction pointing to a vehicle tail is rear. Specifically, "upper, lower, left, right, front and rear" may refer to FIGS. 2 and 6, and "interior and exterior" refers to interiors and exteriors of contours of relevant parts. In addition, it should be noted that terms used, such as "first" and "second", are to distinguish one element from another, and do not indicate sequence and importance. In addition, in the description with reference to the drawings, the same numeral in different drawings represents the same element.

The disclosure relates to the field of vehicles, and in particular to a cell-to-body structure and a vehicle.

In the related art, a middle of a vehicle body structure (i.e. a position of a passenger cabin) of a vehicle usually includes a floor panel, a vehicle body cross member, sill beams, etc., which jointly form a front floor assembly of a vehicle body. A cell pack of the vehicle is generally mounted below the sill beams, and a top of a cell pack case and the floor panel are arranged in a spaced manner in a vertical direction of the vehicle. The top of the cell pack case and the floor panel of the vehicle body are both platy structures having large area and have large weight, such that total weight of the vehicle body structure is large, which is not conducive to light weight of the vehicle and affects endurance mileage of the vehicle. Moreover, there is a safety gap between the top of the cell pack case and the floor panel in the vertical direction, which increases the size of the cell pack in the vertical direction, resulting in low energy density of the cell pack and insufficient space utilization of the vehicle in the vertical direction.

In view of this, as shown in FIGS. 1-8, the disclosure provides a cell-to-body structure. The cell-to-body structure includes a vehicle body 1 and a power cell pack 2. The vehicle body 1 includes two sill beams 11, the two sill beams 11 being arranged in a spaced manner in a left-right direction of a vehicle, and a cell pack mounting portion 111 being arranged on each of the sill beams 11. The power cell pack 2 includes a cell pack case 21, the cell pack case 21 including a case body 211 and a cross beam 24, the case body 211 being connected to the cell pack mounting portion 111, the cross beam 24 extending in the left-right direction and being located between the two sill beams 11, the cross beam 24 being integrated at a top of the case body 211 and being connected to the vehicle body 1, and the top of the case body 211 being used as a floor panel of the vehicle.

With the above technical solution, the power cell pack 2 is mounted on the sill beams 11 by means of the cell pack mounting portions 111, and the top of the case body 211 of the power cell pack 2 is used as the floor panel of the vehicle. Compared with the solution that both a floor panel and a top of a cell pack case are arranged in a spaced manner in a vertical direction in the related art, the top of the case body 211 of the power cell pack 2 in the cell-to-body structure provided in the disclosure is not only used as part of the cell pack case 21, but also used as the floor panel of the vehicle, such that it is unnecessary for the vehicle body 1 to separately arrange a platy structure as the floor panel. This is conducive to reduction of structural redundancy between the cell pack and the vehicle body 1, improvement in an integration degree of the vehicle, reduction of weight of a vehicle body 1 structure, light weight of the vehicle, and increase in endurance mileage of the vehicle.

Moreover, since it is unnecessary to separately arrange the platy structure as the floor panel, an arrangement space of the cell pack 2 in the vertical direction is enlarged. Accordingly, a size of the power cell pack 2 in the vertical direction may be increased, and more batteries may be carried; and a space of the vehicle in the vertical direction is reasonably utilized, energy density of the cell pack is improved, and the endurance mileage of the vehicle may be further increased.

Figure 2:
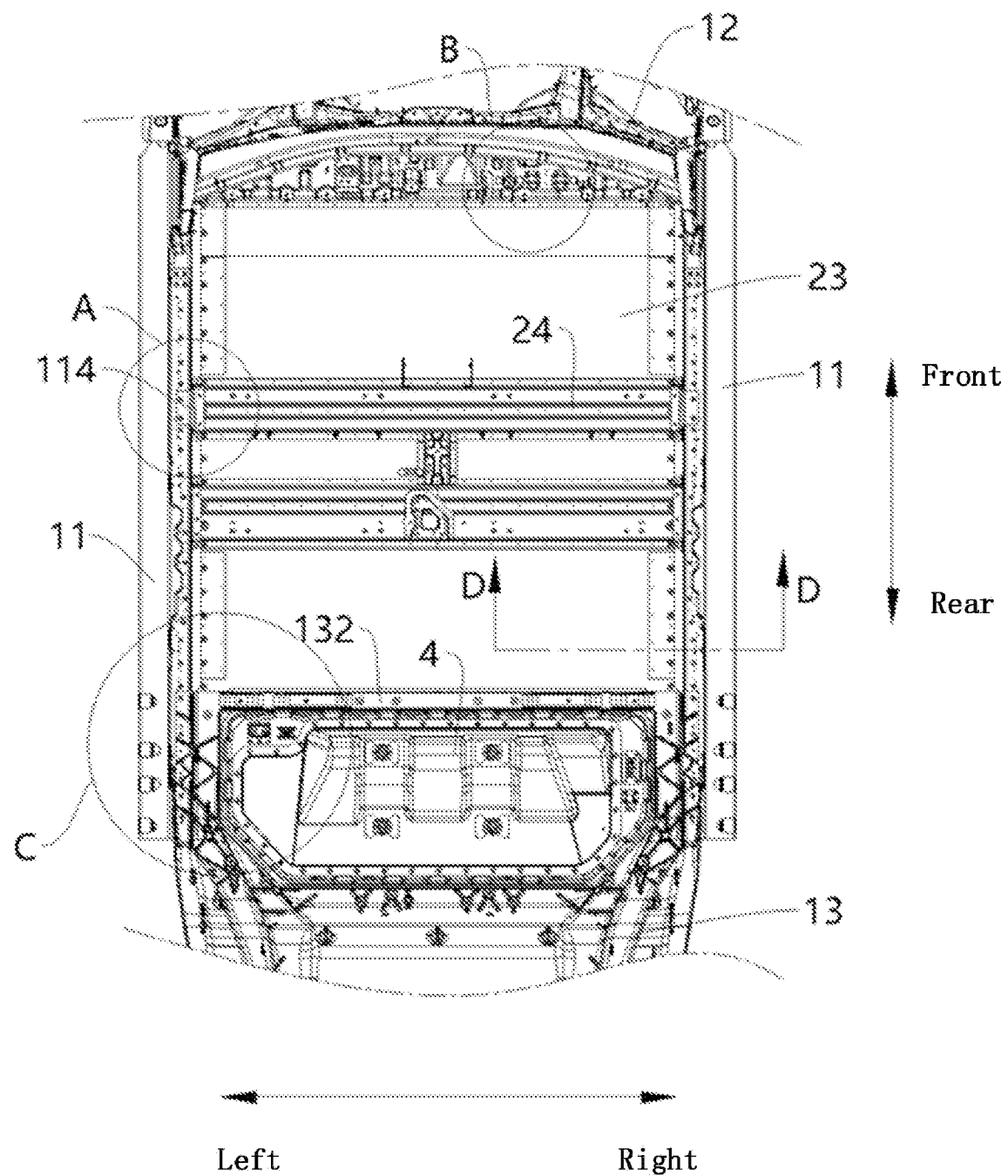
FIG. 2 is a partial top view of a cell-to-body structure in accordance with an embodiment of the disclosure.

Moreover, as shown in FIG. 2, the cross beam 24 is integrated at the top of the case body 211 of the power cell pack 2. The cross beam 24 may be a seat beam, a mounting beam, etc. The cross beam 24 is connected to the vehicle body 1 such that an edge portion of the case body 211 may be connected to the cell pack mounting portions 111 of the sill beams 11. A middle of the case body 211 may be connected to the vehicle body 1 by means of the cross beam 24, such that connection positions between the case body 211 and the vehicle body 1 are increased. Thus, stability of connecting the power cell pack 2 to the vehicle body 1 may be improved, and shake or vibration of the power cell pack 2 generated when the vehicle moves is reduced. Moreover, the cross beam 24 may produce an effect of reinforcing the top of the case body 211, and may improve rigidity of the top of the case body 211. When the vehicle is subjected to side impact, since the cross beam 24 is arranged between the two sill beams 11 and extends in the left-right direction, the sill beams 11 of the vehicle body 1 may transfer an external force to the cross beam 24, such that the external force is dispersed, collapse and deformation of the vehicle body 1 are reduced, and safety of the vehicle is improved.

The cell-to-body structure may be applied to electric vehicles and hybrid vehicles, such that it is conducive to reduction of weight of the vehicle, and increase in endurance mileage of the vehicle.

Since the top of the case body 211 of the power cell pack 2 is used as the floor panel of the vehicle body 1, in order to ensure excellent sealing performance above the top of the case body 211, as shown in FIG. 1, in some examples, the cell-to-body structure may further include a sealing layer 3. The sealing layer 3 is used for sealing a gap between the top of the case body 211 of the cell pack and the vehicle body 1. Since the top of the case body 211 is used as the floor panel, i.e., a floor of a passenger cabin, and a lower portion of the case body 211 is located in a chassis space in a lower portion of the vehicle, and the gap between the top of the case body 211 of the cell pack and the vehicle body 1 is sealed by means of the sealing layer 3, such that an internal cabin space and the chassis space of the vehicle may be sealed from each other, dust, impurities or liquids in the chassis space or an external environment are prevented from entering an interior of the vehicle body 1 by means of the gap between the top of the case body 211 and the vehicle body 1, and sealing performance of the internal cabin space of the vehicle is ensured.

The above sealing layer 3 may be a sealing gasket, or a sealing layer 3 formed by curing an adhesive or a foaming sealant. The disclosure does not limit the specific composition and structure of the sealing layer 3. In the above example, in order to ensure that the sealing layer 3 has excellent sealing performance, in some examples, the sealing layer 3 may be an annular sealing layer, the cross beam 24 may be located on an inner side of the annular sealing layer, and the cell pack mounting portions 111 are located on outer side of the annular sealing layer. Since the cross beam 24 is located at the top of the case body 211, an area used as the floor panel of the cross beam 24 and the top of the case body 211 may be located on the inner side of the annular sealing layer, and the cell pack mounting portions 111 are located on the outer side of the annular sealing layer, such that it is ensured that the sealing layer may completely seal and isolate the internal cabin space and the external cabin space of the vehicle body 1. Thus, impurities, dust or liquids are prevented from entering the cabin. In the example in which the cross beam 24 is the seat beam 241, since the seat beam 241 is located inside the annular sealing layer, and it may be ensured that a space in which the seat beam 241 is located is separated from a space below the vehicle, stability and safety of the seat beam 241 is ensured.

In the case that the sealing layer 3 is used for sealing the gap between the top of the case body 211 of the cell pack and the vehicle body 1, the gap is between the position of the vehicle body 1 close to the top of the shell body 211 and the top of the case body 211. The position of the vehicle body 1 close to the top of the case body 211 may include an inherent structure of the vehicle body 1 (e.g., a front panel or a rear floor panel), or a sealing connection structure (e.g., a sealing surface, a sealing plate, or a sealing flange) formed on the vehicle body 1 for sealing.

Figure 3:
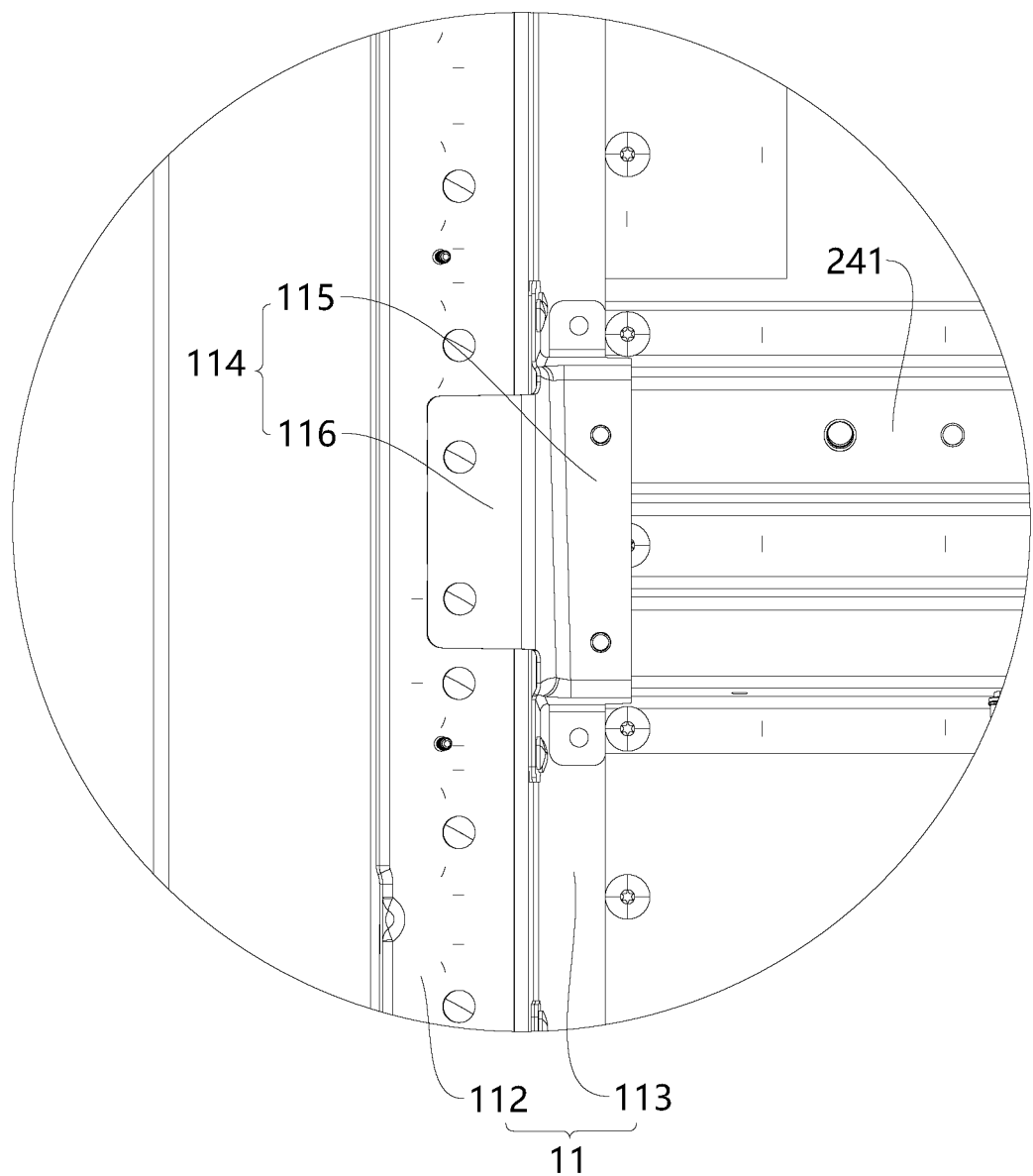
FIG. 3 is an enlarged view of a portion "A" in FIG. 2.

As shown in FIGS. 2 and 3, as an example, each of the sill beams 11 may include a sill beam body 112 and a sealing plate 113 formed on the sill body 112. The sealing plate 113 is located above the case body 211 and extends towards a direction close to the cross beam 24, and part of the sealing layer 3 is located between the top of the case body 211 and the sealing plate 113. A gap between the sealing plate 113 and the top of the case body 211 is filled with the sealing layer 3. The sealing plate 113 extends towards a direction close to the cross beam 24. The sealing plate 113 and the top of the case body 211 are arranged in a spaced manner. The sealing plate 113 may increase contact area between the sealing plate and the sealing layer 3, and thus it is less likely to generate a gap or a notch. This ensures excellent sealing performance between the sill beams 11 and the top of the case body 211.

Figure 4:
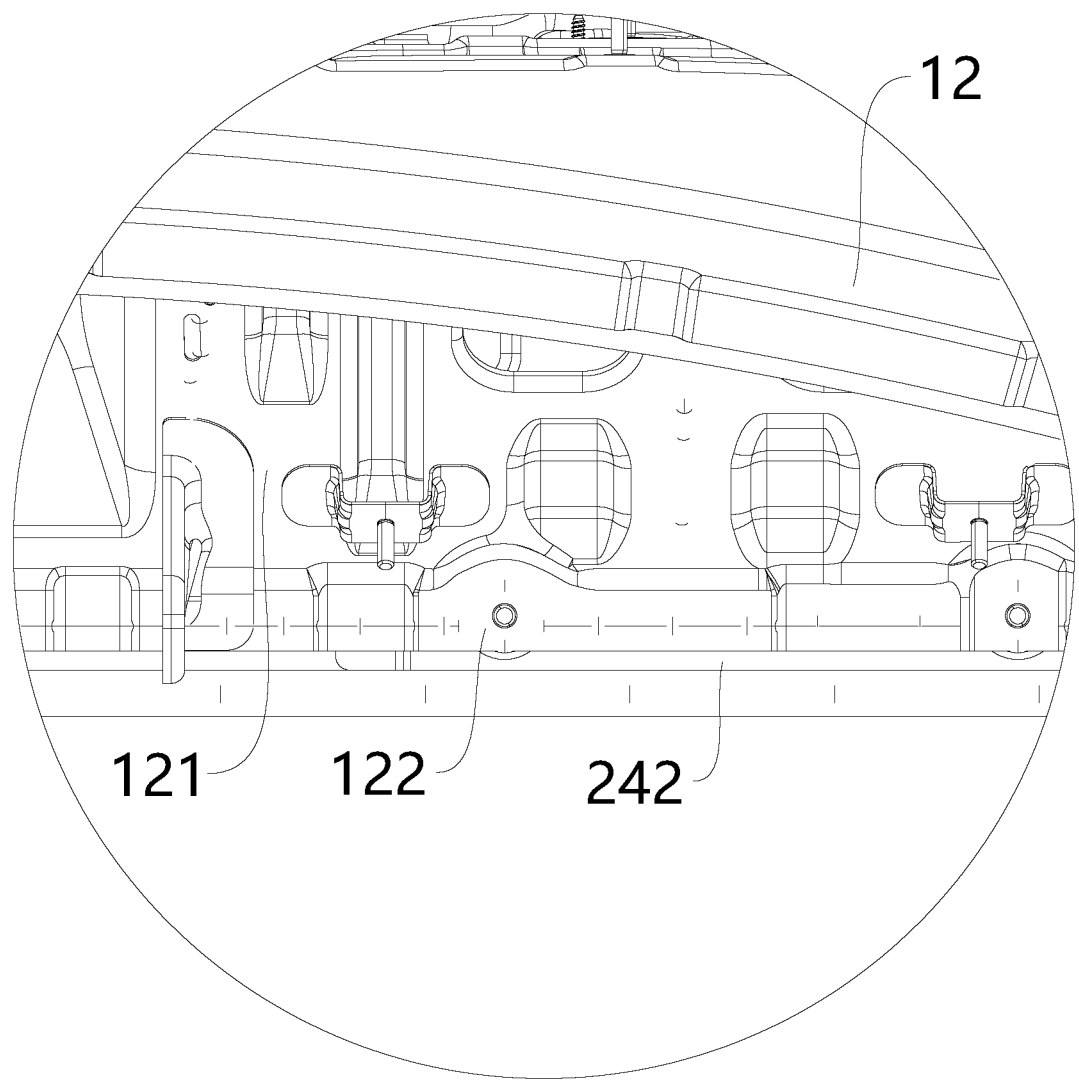
FIG. 4 is an enlarged view of a portion "B" in FIG. 2.

As shown in FIGS. 2 and 4, in some examples, a front end of the top of the case body 211 may be connected to the front panel 121 of the vehicle body 1. The sealing layer 3 may include a front sealing portion, where a gap between the front end of the top of the case body 211 and a lower portion of the front panel 121 of the vehicle body 1 is filled with the front sealing portion.

In some examples, a rear end of the top of the case body 211 may be connected to the rear floor panel of the vehicle body 1. The sealing layer 3 may include a rear sealing portion, where a gap between the rear end of the top of the case body 211 and the rear floor panel of the vehicle body 1 is filled with the rear sealing portion.

In some examples, the front sealing portion, the rear sealing portion and the part of the sealing layer 3 filling the gaps between the sill beams 11 and the case body 211 may jointly form the annular sealing layer, so as to avoid a sealing notch between the vehicle body 1 and the top of the case body 211 and ensure a sealing effect.

The cross beam 24 integrated at the top of the case body 211 may be the seat beam 241 and/or a mounting beam for mounting the cell pack case 21. As shown in FIG. 2, as an example, the cross beam 24 may include a seat beam 241. Each of the sill beams 11 includes a sill beam body 112 and a connection support 114 integrated on the sill beam body 112. Two ends of the seat beam 241 in the left-right direction are connected to the two connection supports 114 respectively.

In the above example, the seat beam 241 is integrated at the top of the case body 211 of the cell pack case 21. When the power cell pack 2 is assembled, the seat beam 241 integrated at the top of the case body 211 is connected to the connection supports 114 integrated on the sill beam bodies 112, such that the power cell pack 2 may be connected to the vehicle body 1. In the related art, a seat beam is generally arranged above a floor panel, and there is no direct connection relation between the seat beam and a cell pack case. One end of the seat beam in the related art is connected to a sill beam. The other end of the seat beam is connected to a middle channel structure. In a left-right direction of a vehicle, the two seat beams are separated by the middle channel structure in a middle, and rigidity of the two seat beams arranged in a spaced manner in the left-right direction is low. Compared with the seat beam in the related art, the two ends of the seat beam 241 provided in the disclosure are directly connected to the two sill beams 11. Thus, the seat beam 241 may generate an effect of dispersing external forces applied to the sill beams 11, such that the vehicle body 1 has better side impact force transfer performance. When the vehicle is subjected to side impact, the sill beams 11 may transfer the applied external forces to the seat beam 241, such that the external forces are dispersed, and deformation and collapse of the vehicle are reduced when the vehicle is subjected to the external force, such that stability and safety of the vehicle are ensured. Moreover, the seat beam 241 is integrated at the top of the case body 211, and it is unnecessary to mount the seat beam 241 on other platy structures (e.g., a floor panel in the related art), such that the number of parts for mounting and fixing between the vehicle body 1, the seat beam 241, and the cell pack case 21 is reduced, an integration degree of the vehicle is improved, and weight of the vehicle is reduced, so as to improve endurance of the vehicle.

The seat beam 241 may be integrated at the top of the case body 211 by means of bolt connection or welding, etc. In addition, the seat beam 241 may be formed into a beam structure having an I-shaped, square-shaped or n-shaped cross section, and the specific structure of the seat beam 241 is not limited in the disclosure. As an example, the seat beam 241 may be formed into a cross beam structure having a n-shaped cross section. The seat beam 241 includes a beam flange. The beam flange is arranged parallel to the top of the case body 211 and is welded to the top of the case body 211, such that it is ensured that the seat beam 241 may be stably connected to the cell pack case 21.

In order to further improve torsional rigidity of the seat beam 241, in some examples, the seat beam 241 may include at least two upper protrusions arranged in a spaced manner in a front-rear direction of the vehicle, and a lower recession is arranged between every two adjacent upper protrusions (for example, the seat beam 241 may be formed into a structure having at least two connected n-shaped cross sections). The lower recession is connected to the top of the case body 211. The seat beam 241 has excellent torsional rigidity and side impact force transfer performance, and may strengthen a strength of the top of the cell pack case 21 and ensure safety of the power cell pack 2.

The seat beam 241 is connected to the sill beams 11 by means of the connection supports 114. As shown in FIG. 3, in some examples, each of the connection supports 114 may include a beam connector 115 and a sill beam connector 116, where the beam connector 115 and an end of the seat beam 241 may be sleeved with each other to ensure tight connection between the beam connector 115 and the seat beam 241. The sill beam connector 116 may include a plurality of lap flanges for being in lap joint with outer side surfaces of the sill beams 11. The lap flanges may be fixedly connected to the sill beams 11 by means of a welding process. In the example in which each of the sill beams 11 includes the sealing plate 113, the sealing plate 113 extends from the sill beams 11 to the seat beam 241, and each of the sill beam connectors 116 may further include a lap flange for being in lap joint with an upper end of the sealing plate 113. That is, the sill beam 11 connectors are connected to outer side walls of the sill beams 11 and an upper surface of the sealing plate 113 by means of the lap flanges, and are fixed to the sill beams 11 by means of the plurality of lap flanges, such that degrees of freedom of the sill beams 11 and the connection supports 114 may be defined from different directions, and further stability of connection is ensured.

Figure 6:
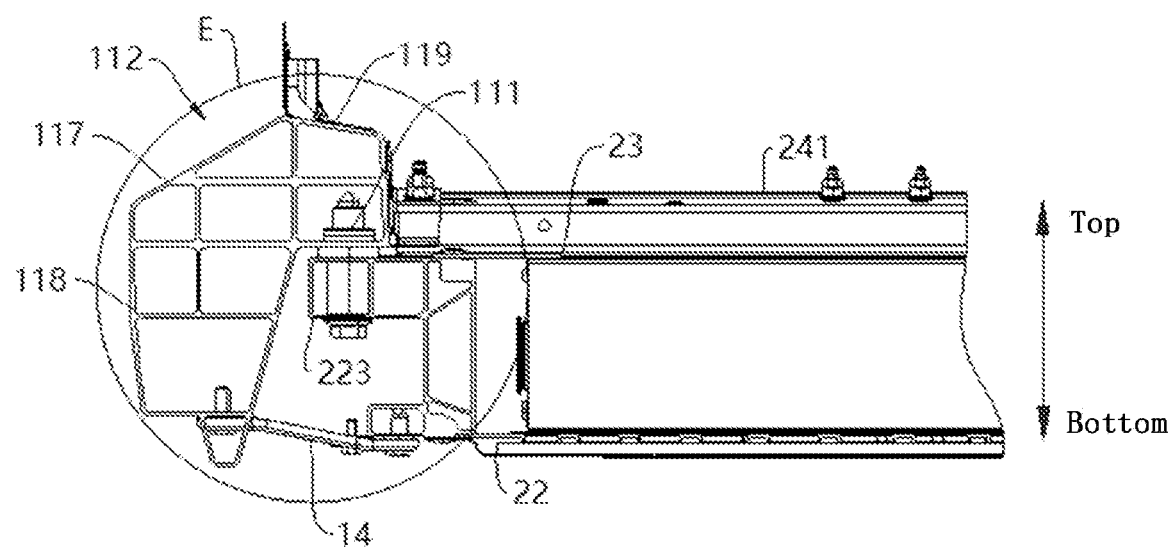
FIG. 6 is a sectional view after sectioning in a line "D-D" in FIG. 2.

In the example in which the seat beam 241 is included, in some examples, as shown in FIG. 6, each of the sill beam bodies 112 includes a first portion 117 and a second portion 118 located below the first portion 117. The first portion 117 protrudes out of the second portion 118 towards a direction close to the seat beam 241, so as to form an accommodation space for accommodating the case body 211 between the first portion 117 and the second portion 118. The connection supports 114 are integrated on the first portions 117, and the seat beam 241 is welded to the top of the case body 211. The seat beam 241 is connected to the first portions 117 of the sill beam bodies 112 by means of the connection supports 114. An accommodation space for accommodating the case body 211 is formed between the first portions 117 and the second portions 118. The accommodation space may accommodate the cell pack case 21, so as to avoid positional interference between the sill beam bodies 112 and the cell pack case 21, such that the arrangement position of the power cell pack 2 is allowed to move upwards, so as to use the top of the cell pack case 21 as a floor panel of the vehicle. The seat beam 241 is allowed to be integrated at the top of the cell pack case 21 on the premise of ensuring an arrangement height of the seat beam 241.

In the above example, the seat beam 241 is connected to the first portions 117 of the sill beam bodies 112 by means of the connection supports 114. When being collapsed due to an external force, the first portions 117 of the sill beam bodies 112 may transfer the external force to the seat beam 241 by means of the connection supports 114. The seat beam 241 may disperse and absorb the external force, so as to reduce deformation of the vehicle body 1 and the cell pack case 21, and protect safety of the power cell pack 2 and the passenger cabin in the vehicle. The above cell-to-body structure has a first force transfer path, that is, external forces are transferred to the connection supports 114 by means of the first portions 117 of the sill beam bodies 112, and are transferred to the seat beam 241 by means of the connection supports 114.

Figure 7:
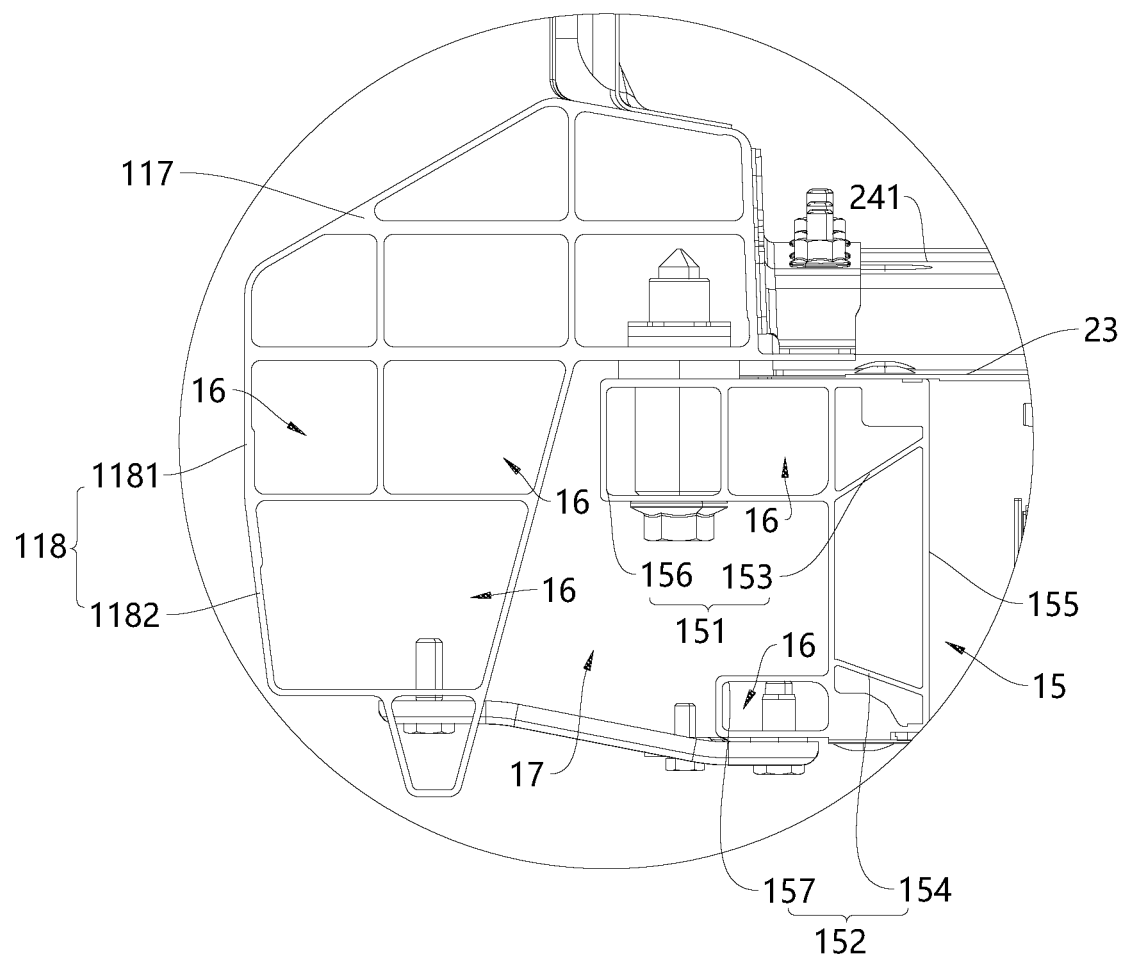
FIG. 7 is an enlarged view of a portion "E" in FIG. 6.

In order to improve side impact safety of the vehicle, in some examples, as shown in FIG. 7, each of the second portions 118 may be provided with a first upper force transfer portion 1181 and a first lower force transfer portion 1182 located below the first upper force transfer portion 1181. The case body 211 includes a side frame stringer 15 extending in a front-rear direction of the vehicle. The side frame stringer 15 being provided with a second upper force transfer portion 151 and a second lower force transfer portion 152 located below the second upper force transfer portion 151. Projections of the first upper force transfer portions 1181 in the left-right direction at least partially overlap a projection of the second upper force transfer portion 151 in the left-right direction. Projections of the first lower force transfer portions 1182 in the left-right direction at least partially overlap a projection of the second lower force transfer portion 152 in the left-right direction. The second upper force transfer portion 151 is configured to be capable of transferring an impact force to the top of the case body 211, and the second lower force transfer portion 152 is configured to be capable of transferring an impact force to a bottom of the case body 211.

When the second portions 118 of the sill beams 11 are subjected to external forces due to side impact, the second portions 118 may transfer the external forces to the second upper force transfer portion 151 of the side frame stringer 15 by means of the first upper force transfer portions 1181. The second upper force transfer portion 151 may transfer the external forces to the top of the case body 211. Moreover, the second portions 118 may further transfer the external forces to the second lower force transfer portion 152 of the side frame stringer 15 by means of the first lower force transfer portions 1182, and the second lower force transfer portion 152 may transfer the external forces to the bottom of the case body 211. That is, the second portions 118 may transfer the external forces to the top and the bottom of the case body 211 by means of the side frame stringer 15, respectively, and disperse and absorb the external forces to reduce deformation of a middle of the cell pack case 21 under an action of the external forces, and avoid damage to battery cells inside the cell pack case 21, such that driving safety is ensured. [A1][A2]

In some examples, as shown in FIG. 7, the second upper force transfer portion 151 may include an upper force transfer rib 153, and the second lower force transfer portion 152 may include a lower force transfer rib 154. At least part of the upper force transfer rib 153 extends obliquely upwards towards the top of the case body 211, and at least part of the lower force transfer rib 154 extends obliquely downwards towards the bottom of the case body 211, so as to transfer the impact forces to the top of the case body 211 and the bottom of the case body 211 upwards and downwards, respectively.

Moreover, the upper force transfer rib 153 extends obliquely upwards. When the external force of side impact is transferred to the interior of the vehicle by means of the upper force transfer rib 153, the upper force transfer rib 153 may decompose the external force of side impact into a vertical component facing upwards and a horizontal component facing the interior of the vehicle, such that a force value of deformation of the power cell pack 2 due to transferring of the external force of side impact to the power cell pack 2 is reduced. Similarly, the lower force transfer rib 154 extends obliquely downwards, and the lower force transfer rib 154 may decompose the external force of side impact into a vertical component facing downwards and a horizontal component facing the interior of the vehicle, such that a force value of deformation of the power cell pack 2 due to transferring of the external force of side impact to the power cell pack 2 is reduced. Moreover, the upward vertical component decomposed by the upper force transfer rib 153 and the downward vertical component decomposed by the lower force transfer rib 154 may be offset with each other, such that the force value of the external force of side impact transferred to the case body 211 by means of the upper force transfer rib 153 and the lower force transfer rib 154 is reduced. Thus, deformation generated by the case body 211 is reduced, and further safety of the power cell pack 2 is ensured.

In some examples, the side frame stringer 15 may include a frame stringer body 155. The frame stringer body 155 is hollow, and the upper force transfer rib 153 and the lower force transfer rib 154 are arranged in the frame stringer body 155. The second upper force transfer portion 151 further includes a first side mounting lug 156 formed on one side of the frame stringer body 155 close to the second portion 118. The second lower force transfer portion 152 further includes a second side mounting lug 157 formed on one side of the frame stringer body 155 close to the second portion 118. The first side mounting lug 156 are connected to the first portion 117, and the second side mounting lug 157 are connected to the second portion 118. At least one energy absorption cavity 16 is formed in each of the first upper force transfer portion 1181, that first lower force transfer portion 1182, the first side mounting lug 156 and the second side mounting lug 157.

In the above example, when the second portions 118 of the sill beam 11 bodies are collapsed towards the interior of the vehicle by the external forces, collapse generated by the second portion 118 may absorb and buffer part of the external force of side impact. When the second portion 118 is collapsed towards the interior of the vehicle and makes contact with the side frame stringer 15, the second portion 118 makes contact with the first side mounting lug 156 and the second side mounting lug 157 on one side of a frame stringer body 155 close to the second portions 118, and the first side mounting lug 156 and the second side mounting lug 157 may be collapsed to absorb and buffer part of the external force of side impact. After the first side mounting lug 156 and the second side mounting lug 157 are collapsed, the external force may be transferred to the frame stringer body 155. The impact force may be dispersed to the top of the case body 211 and the bottom of the case body 211 by means of the upper force transfer rib 153 and the lower force transfer rib 154 in the frame stringer body 155. The force at the top of the case body 211 may be further transferred to the seat beam 241, such that stress deformation of the cell pack case 21 is reduced, and safety of battery cells inside the cell pack case 21 is ensured.

Thus, it may be seen that the cell-to-body structure may further have a second force transfer path and a third force transfer path. In the second force transfer path, the external forces are transferred to the first side mounting lug 156 by means of the second portion 118 of the sill beam body 112. The first side mounting lug 156 may disperse and guide the external forces by means of the upper force transfer rib 153, so as to transfer a horizontal component of the external force of side impact to the top of the case body 211. In the third force transfer path, the external forces are transferred to the second side mounting lug 157 by means of the second portion 118 of the sill beam body 112. The second side mounting lug 157 may disperse and guide the external forces by means of the lower force transfer rib 154, so as to transfer a horizontal component of the external force of side impact to the bottom of the case body 211. The first force transfer path, the second force transfer path and the third force transfer path disperse, absorb and buffer the external forces of side impact applied to the sill beam body 112, respectively, such that damage to the power cell pack 2 caused by the external forces may be reduced to the maximum extent, and safety of the power cell pack 2 and personnel in the passenger cabin of the vehicle is ensured.

In order to ensure an energy absorption effect, in some examples, the side frame stringer 15 and the second portions 118 are arranged in a spaced manner in the left-right direction to define impact buffer cavities 17. When the second portions 118 are subjected to the external force of side impact to generate collapse deformation towards the inner side of the vehicle, the impact buffer cavities 17 may reserve deformation buffer spaces for collapse deformation of the second portions 118, such that force transfer of the second portions 118 to the side frame beam 15 is reduced.

In some examples, the impact buffer cavities 17 may be jointly defined by the first side mounting lug 156, the second side mounting lug 157, the frame member body 155, and the sill beam body 112.

Figure 8:
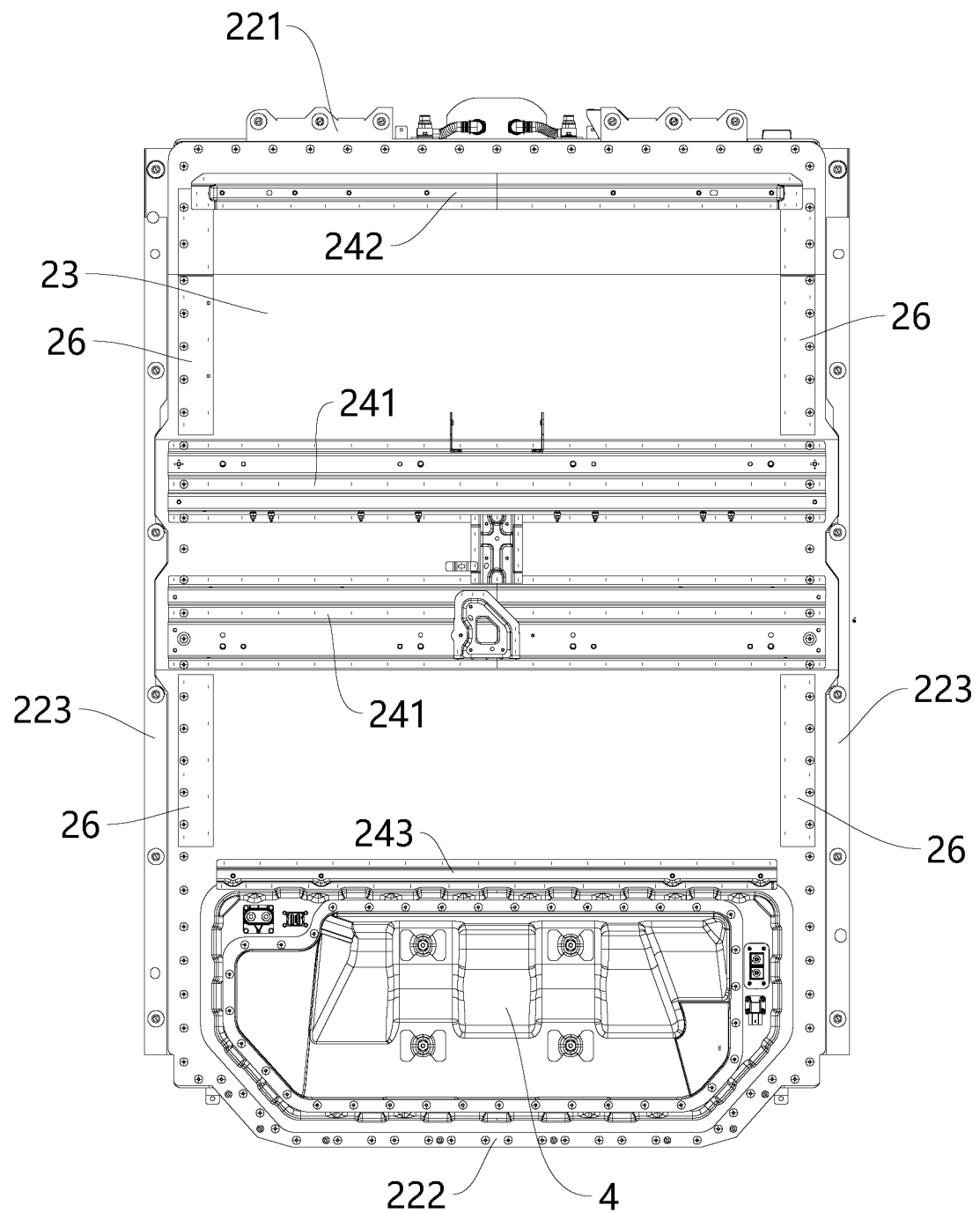
FIG. 8 is a top view of a power cell pack of a cell-to-body structure in accordance with an embodiment of the disclosure.

As another implementation, the cross beam 24 may include a mounting beam for connecting the cell pack case 21 and the vehicle body 1. As shown in FIG. 8, the mounting beam may be a cell pack mounting front beam 242 connected to a front of the vehicle body 1 or a mounting rear beam 243 connected to a rear of the vehicle body 1.

As shown in FIGS. 2 and 4, in some examples, the vehicle body 1 may include a front cabin structure assembly 12. The cross beam 24 includes a cell pack mounting front beam 242. The cell pack mounting front beam 242 is located at a position close to the front cabin structure assembly 12 at the top of the case body 211. The cell pack mounting front beam 242 is connected to a rear of the front cabin structure assembly 12. The cell pack mounting front beam 242 may strengthen overall rigidity of the case body 211, and ensure safety and stability of the top of the case body 211. Since the cell pack mounting front beam 242 is located between the two sill beams 11, the cell pack mounting front beam 242 may disperse the external forces applied to the sill beams 11, and improve side impact force transfer performance of the vehicle. Moreover, since the cell pack mounting front beam 242 is connected to the front cabin structure assembly 12 of the vehicle body 1, the cell pack mounting front beam 242 may improve front impact force transfer performance of the vehicle. When a front cabin of the vehicle is subjected to the external forces, the front cabin structure assembly 12 of the vehicle body 1 may disperse the external forces by means of the cell pack mounting front beam 242, such that collapse deformation generated by the front cabin structure assembly 12 of the vehicle is reduced, a battery cell structure in the cell pack case 21 is protected, and safety of the vehicle is ensured.

In order to facilitate connection of the cell pack mounting front beam 242 and the front cabin structure assembly 12, in some examples, the front cabin structure assembly 12 includes a front panel 121. A connection flange 122 is formed on the front panel 121, and a top of the cell pack mounting front beam 242 is connected to the connection flange 122. The cell pack mounting front beam 242 may be connected to the front cabin structure assembly 12 in a bolted connection or welded mode. In an example of bolted connection, a plurality of connection bolts arranged in a spaced manner in the left-right direction may be arranged on the cell pack mounting front beam 242, and a plurality of connection holes corresponding to mounting holes may be formed on the connection flange 122, so as to allow the connection bolts to pass.

Figure 5:
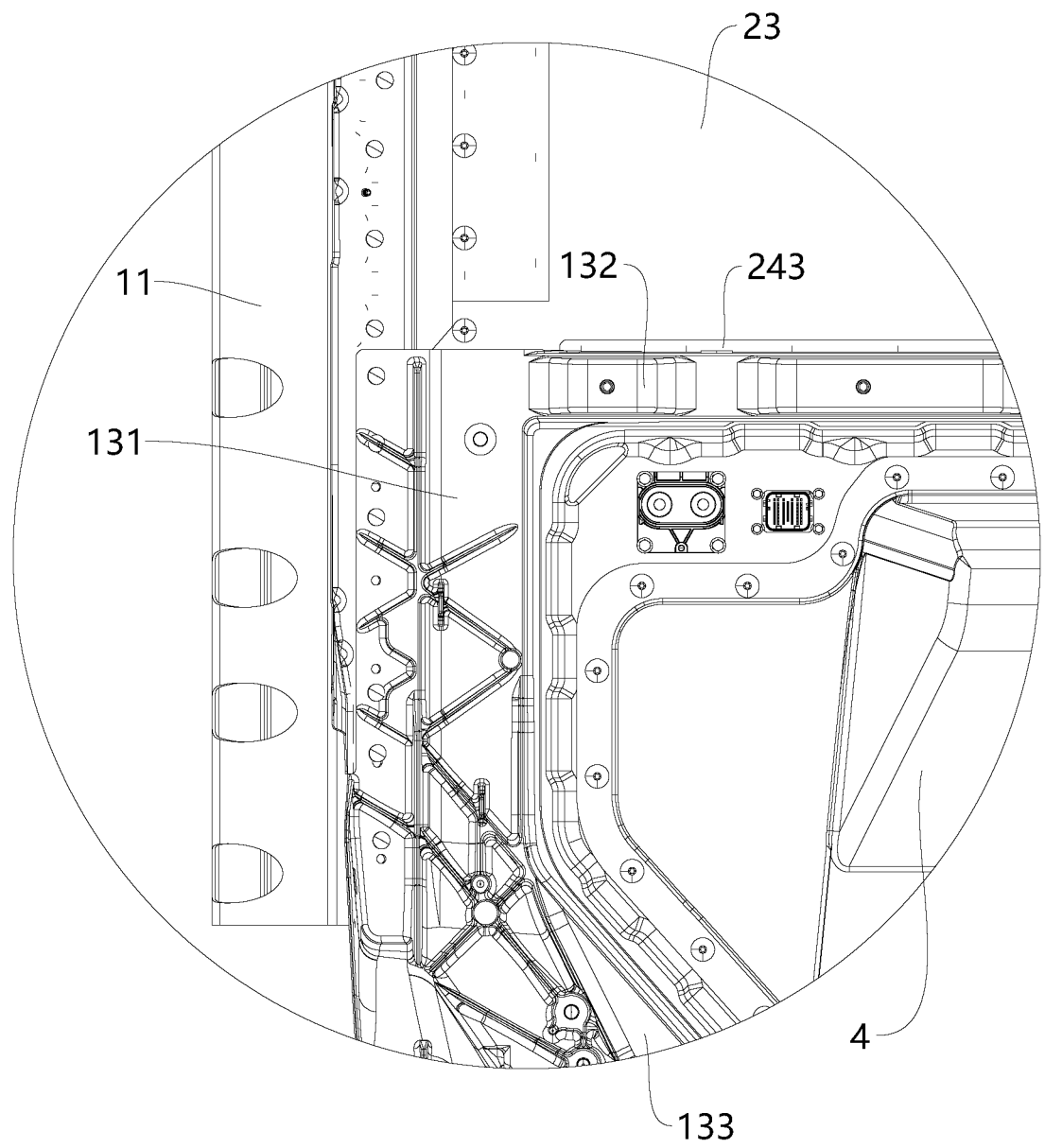
FIG. 5 is an enlarged view of a portion "C" in FIG. 2.

As shown in FIGS. 2 and 5, in some examples, the vehicle body 1 may further include a rear floor assembly 13. The cross beam 24 includes a cell pack mounting rear beam 243. The cell pack mounting rear beam 243 is located at a position close to the rear floor assembly 13 at the top of the case body 211, and the cell pack mounting rear beam 243 is connected to a front of the rear floor assembly 13. The cell pack mounting rear beam 243 may strengthen overall rigidity of the case body 211. This may ensure safety and stability of the top of the case body 211, may further disperse the external forces applied to the sill beams 11, and may improve side impact force transfer performance of the vehicle. Moreover, since the mounting rear beam 243 is connected to the rear floor assembly 13 of the vehicle body 1, the mounting rear beam 243 may improve rear impact force transfer performance of the vehicle. When the rear of the vehicle is acted by an external force, the rear floor assembly 13 of the vehicle body 1 may disperse the external force by means of the mounting rear beam 243, such that collapse deformation generated by the rear floor assembly 13 of the vehicle is reduced, the battery cell structure inside the cell pack case 21 is protected, and safety of the vehicle is ensured.

In order to facilitate connection between the rear floor assembly 13 and the mounting rear beam 243, in some examples, the rear floor assembly 13 includes two rear stringers 131 and a rear floor front beam 132 connected between front ends of the two rear stringers 131. Front ends of the two rear stringers 131 are in lap joint with the two sill beams 11, respectively. The cross beam 24 includes a cell pack mounting rear beam 243, a top of the cell pack mounting rear beam 243 being connected to the rear floor front beam 132. That rear floor assembly 13 is in lap joint with the sill beams 11 by means of the two rear stringers 131 to ensure stable connection between the rear floor assembly 13 and the sill beams 11. When the rear floor assembly 13 is subjected to the external force, the external force may be transferred to the sill beams 11 by means of the rear stringers 131 to be dispersed, and the rear floor front beam 132 may be supported between the two rear stringers 131 to further improve overall rigidity and torsional resistance of the rear floor assembly 13, and ensure stability and safety of the rear floor assembly 13.

A cell manager mounting box 4 of the vehicle may be mounted behind the vehicle, i.e., the cell manager mounting box of the vehicle may be accommodated in a position close to the rear floor assembly 13. In order to facilitate mounting of the cell manager mounting box 4, as shown in FIGS. 2, 5 and 8, in some examples, the rear floor assembly 13 further includes a rear floor 133 located between the two rear stringers 131, and the power cell pack 2 further includes a cell manager mounting box 4. The cell manager mounting box 4 is arranged at the top of the case body 211 and is located behind the cell pack mounting rear beam 243, and an opening for the cell manager mounting box 4 to pass through is formed on the rear floor 133. The cell manager mounting box 4 may be accommodated in the accommodation space surrounded by the top of the cell pack case 21, the two rear stringers 131, the rear floor front beam 132 and the rear floor 133. The two rear stringers 131, the rear floor front beam 132 and the rear floor 133 may protect the cell manager mounting box 4 and ensure safety of a cell manager inside the cell manager mounting box 4.

In the example of the disclosure, as shown in FIG. 6, being close to the vehicle body 1, the top of the case body 211 is used as a floor panel. When the case body 211 of the power cell pack 2 is of an integrally-formed case structure internally having an accommodating cavity for accommodating batteries, the top of the case body 211 refers to a top plate of the integrally-formed case structure. In the example that a case body 211 includes an upper cover plate 23 and a lower case 22. The upper cover plate 23 covers the lower case 22. An accommodating space for accommodating a power cell is jointly delimited by the upper cover plate and the lower case 22. The top of the case body 211 is the upper cover plate 23 of the case body 211. The cross beam 24 is integrated on a top surface of the upper cover plate 23.

In order to ensure that the top of the case body 211 has excellent rigidity, as shown in FIG. 8, in some examples, a reinforcing plate 26 may be further arranged on a case body 211. The reinforcing plate 26 is used for reinforcing rigidity of a top of the case body 211 and improving safety and stability of the top of the case body 211 as a floor panel. As an example, a reinforcing plate 26 may be located at a top of a case body 211. The reinforcing plate 26 extends in a front-rear direction. A projection of the reinforcing plate 26 in a vertical direction at least partially overlaps projections of sill beams 11 and a battery cell in the vertical direction, so as to ensure that the top of the case body 211 has high rigidity. This improves connection strength between a cell pack case 21 and sill beams 11, and protects safety of the battery cell inside a power cell pack 2.

In some examples, the top of the case body 211 may be an integrally-formed platy structure, or may be formed by splicing a plurality of plate bodies. As an example, a top of the case body 211 is formed by splicing a plurality of plate bodies. A thickness of the plate body in which a seat beam 241 is located in the plurality of plate bodies is greater than that of each of the remaining plate bodies. Since the seat beam 241 is a load-bearing member of a seat, the thickness of the plate body in which the seat beam 241 is located is large, such that the top of the case body 211 may be prevented from being deformed after the seat is mounted.

Specifically, the plurality of plate bodies may include a first plate body, a second plate body, a third plate body and a fourth plate body which are sequentially spliced in the front-rear direction. The cell pack mounting front beam 242 is arranged on the first plate body. The seat beam 241 is arranged on the third plate body, The cell pack mounting rear beam 243 is arranged on the fourth plate body. The thickness of the third plate body is greater than the thickness of the first plate body. The thickness of the first plate body is greater than the thickness of the second plate body. The thickness of the second plate body is greater than or equal to the thickness of the fourth plate body. Since the first plate body is located at a front of the case body 211 and is used for bearing the cell mounting front beam 242, the thickness of the first plate body may be thicker than the thickness of the second plate body and the fourth plate body in order to reduce a deformation degree of the first plate body as much as possible in a process of front impact of the vehicle. The thickness of the second plate body and the fourth plate body is reduced, such that it is conducive to light weight of the vehicle, and increase in endurance mileage of the vehicle.

In an example in which a case body 211 includes a lower case 22 and an upper cover plate 23, as shown in FIG. 8, in some examples, mounting lugs are formed on an peripheral surface of the lower case 22. The mounting lugs include a front mounting lug 221 located in the front of the lower case 22, a rear mounting lug 222 located behind the lower case 22 and side mounting lugs 223 located at a left side and a right side of the lower case 22. The side mounting lugs 223 are connected to the cell pack mounting portions 111, and the cross beam 24 is located behind the front mounting lug 221 and in the front of the rear mounting lug 222. A cell pack case 21 is connected to a vehicle body 1 by means of the front mounting lug 221. The side mounting lugs 223 and the rear mounting lug 222, and the front mounting lug 221, the side mounting lugs 223 and the rear mounting lug 222, are arranged in a circumferential direction, such that connection points are provided between a circumferential direction of a power cell pack 2 and the vehicle body 1. This ensures that the power cell pack 2 has excellent balance and may be stably connected to the vehicle body 1. The cross beam 24 is located behind the front mounting lug 221 and in the front of the rear mounting lug 222. The cross beam 24 is connected to the vehicle body 1, so as to provide a mounting point for the power cell pack 2 on the upper cover plate 23, such that the problem that a middle of the power cell pack 2 is suspended to generate shake or vibration to generate noise is solved, and stability and safety of the power cell pack 2 is ensured.

Moreover, in an example in which the cell pack mounting front beam 242 is integrated at a top of a case body 211, that is, the cell pack mounting front beam 242 is integrated above an upper cover plate 23, the cell pack mounting front beam 242 and the front mounting lug 221 may be connected to a front panel 121 of a front cabin structure assembly 12. A connection position between the front mounting lug 221 and the front panel 121 is located in the front of a connection position between the cell pack mounting front beam 242 and the front panel 121. That is, a front of a cell pack case 21 may be connected to the front panel 121 by means of the cell pack mounting front beam 242 and the front mounting lug 221, respectively, and connection between the front of the cell pack case 21 and a front cabin structure assembly 12 of a vehicle body 1 is more stable. Moreover, when a vehicle is subjected to front impact, the front mounting lug 221 and the cell pack mounting front beam 242 may both absorb impact energy and reduce invasion of the impact energy to the cell pack. Moreover, even if the front mounting lug 221 is disconnected from the front panel 121 in an impact process, the cell pack mounting front beam 242 is connected to the front panel 121, such that the front of the power cell pack 2 may be prevented from being separated from the vehicle body 1 in the impact process as much as possible, and safety of the power cell pack 2 is ensured.

In an example in which a case body 211 includes a cell pack mounting rear beam 243, that is, the cell pack mounting rear beam 243 is integrated above an upper cover plate 23, the cell pack mounting rear beam 243 and a rear mounting lug 222 may be connected to a rear floor assembly 13 of the vehicle, and a connecting position between the cell pack mounting rear beam 243 and the rear floor assembly 13 is located in the front of a connection position between a rear mounting lug 222 and the rear floor assembly 13. A rear end of a cell pack case 21 may be connected to the rear floor assembly 13 by means of the cell pack mounting rear beam 243 and the rear mounting lug 222, connection between the rear end of the cell pack case 21 and the rear floor assembly 13 of the vehicle body 1 is more stable. The rear mounting lug 222 and the cell pack mounting rear beam 243 may both absorb impact energy, and reduce invasion of the impact energy to the power cell pack 2. Moreover, even if the rear mounting lug 222 is disconnected from the rear floor assembly 13 in an impact process, the cell pack mounting rear beam 243 is connected to the rear floor assembly 13, such that the power cell pack 2 may be prevented from being separated from the vehicle body 1 in the impact process as much as possible, and safety of the power cell pack 2 is ensured.

In order to strengthen connection strength between the sill beams 11 and the power cell pack 2, in some examples, the vehicle body 1 may further include a support bracket 14. One end of the support bracket 14 is connected to the sill beams 11, and the other end of the support bracket 14 is connected to the bottom of the case body 211, such that the support bracket 14 may have an effect of supporting the case body 211, improve connection strength between the case body 211 and the sill beams 11, and ensure connection stability between the case body 211 and the sill beams 11.

In an example in which a case body 211 includes side mounting lugs 223, as shown in FIG. 6, as an example, the sill beam 11 may include a first portion 117 and a second portion 118 which are arranged in a vertical direction. The first portion 117 protrudes out of the second portion 118 in a direction close to the cross beam 24 to form a protrusion 119. A cell pack mounting portion 111 is arranged on the protrusion 119. Side mounting lugs 223 of the case body 211 may be connected to the cell pack mounting portion 111 on the protrusion, so as to connect a cell pack case 21 to the sill beam 11. A side portion of the cell pack case 21 may be accommodated between the protrusion 119 and the second portion 118, such that a mounting position of the power cell pack 2 may be moved upwards as a floor panel of a vehicle body 1. The side mounting lug 223 may include a plurality of collapse cavities. The side mounting lug 223 at least partially overlaps the second portion 118 of the sill beam 11 in a left-right direction, and a gap is provided between a side portion of the side mounting lug 223 close to the sill beam 11 and the sill beam 11. When the sill beam 11 is subjected to an external force of side impact, the sill beam 11 is subjected to collapse deformation close to the side mounting lug 223, and the external force may be at least partially absorbed and buffered. When the sill beam 11 is deformed inwards to make contact with the side mounting lug 223, the collapse cavities on the side mounting lug 223 may be subjected to collapse deformation, such that the external force is absorbed, a battery cell in the cell pack case 21 is prevented from being damaged, and safety of the power cell pack 2 is ensured.

A second aspect of the disclosure provides a vehicle. The vehicle includes the above cell-to-body structure. The vehicle herein may be a hybrid vehicle, an electric vehicle, etc. Since the cell-to-body structure in the vehicle may use a top of a case body 211 of a cell pack case 21 as a floor panel of the vehicle, overall weight of the vehicle is reduced, and the vehicle may have greater endurance.

The preferred implementations of the disclosure are described in detail above with reference to the drawings. However, the disclosure is not limited to specific details of the above implementations. Within the scope of the technical concept of the disclosure, various simple modifications may be made to the technical solution of the disclosure, and these simple modifications all fall within the scope of protection of the disclosure.

It should also be noted that various specific technical features described in the above specific implementations may be combined in any suitable manner without contradiction. In order to avoid unnecessary repetition, the disclosure will not describe various possible combinations separately.

In addition, various different implementations of the disclosure may also be combined randomly, so long as various different implementations of the disclosure do not deviate from the idea of the disclosure, and various different implementations of the disclosure should also be regarded as if contained in, and disclosed in the disclosure.

Additional non-limiting embodiments of the disclosure include:

1. A cell-to-body structure, including:
    a vehicle body, which includes two sill beams, the two sill beams being arranged in a spaced manner in a left-right direction of a vehicle, and a cell pack mounting portion is on each of the sill beams; and
    a power cell pack, which includes a cell pack case, the cell pack case including a case body and a cross beam, the case body being connected to the cell pack mounting portion, the cross beam extending in the left-right direction, being located between the two sill beams, being integrated at a top of the case body and being connected to the vehicle body, and the top of the case body being used as a floor panel of the vehicle.
2. The cell-to-body structure according to embodiment 1, further including a sealing layer, where the sealing layer is used for sealing a gap between the top of the case body and the vehicle body.
3. The cell-to-body structure according to embodiment 2, where the sealing layer is an annular sealing layer, the cross beam is on an inner side of the annular sealing layer, and the cell pack mounting portions are on an outer side of the annular sealing layer.
4. The cell-to-body structure according to embodiment 2, where each of the sill beams includes a sill beam body and a sealing plate formed on the sill beam body, the sealing plate is above the case body and extends towards a direction close to the cross beam, and part of the sealing layer is between the top of the case body and the sealing plate.
5. The cell-to-body structure according to embodiment 1, where the cross beam includes a seat beam, each of the sill beams includes a sill beam body and a connection support integrated on the sill beam body, and two ends of the seat beam in the left-right direction are connected to the two connection supports respectively.
6. The cell-to-body structure according to embodiment 5, where each of the sill beam bodies includes a first portion and a second portion below the first portion, the first portion protruding out of the second portion towards a direction close to the seat beam, so as to form an accommodation space for accommodating the case body between the first portion and the second portion.
7. The cell-to-body structure according to embodiment 6, where the connection support is integrated on the first portion, and the seat beam is welded to the top of the case body.
8. The cell-to-body structure according to embodiment 6, where each of the second portions has a first upper force transfer portion and a first lower force transfer portion below the first upper force transfer portion, and the case body includes a side frame stringer extending in a front-rear direction of the vehicle, the side frame stringer has a second upper force transfer portion and a second lower force transfer portion is below the second upper force transfer portion; and projections of the first upper force transfer portions in the left-right direction at least partially overlap a projection of the second upper force transfer portion in the left-right direction, projections of the first lower force transfer portions in the left-right direction at least partially overlap a projection of the second lower force transfer portion in the left-right direction, the second upper force transfer portion is capable of transferring an impact force to the top of the case body, and the second lower force transfer portion is capable of transferring an impact force to a bottom of the case body.

9. The cell-to-body structure according to embodiment 8, where the second upper force transfer portion includes an upper force transfer rib, and the second lower force transfer portion includes a lower force transfer rib, at least part of the upper force transfer rib extending obliquely upwards towards the top of the case body, and at least part of the lower force transfer rib extending obliquely downwards towards the bottom of the case body.

10. The cell-to-body structure according to embodiment 9, where the side frame stringer includes a frame stringer body, the frame stringer body being hollow, and the upper force transfer rib and the lower force transfer rib are in the frame stringer body; the second upper force transfer portion further includes a first side mounting lug on one side of the frame stringer body close to the second portion, and the second lower force transfer portion further includes a second side mounting lug on one side of the frame stringer body close to the second portion, the first side mounting lug being connected to the first portion, and the second side mounting lug being connected to the second portion.

11. The cell-to-body structure according to embodiment 10, where at least one energy absorption cavity is in each of the first upper force transfer portion, that first lower force transfer portion, the first side mounting lug and the second side mounting lug.

12. The cell-to-body structure according to embodiment 8, where the side frame stringer and the second portion are in a spaced manner in the left-right direction to define impact buffer cavities.

13. The cell-to-body structure according to embodiment 1, where the vehicle body further includes a front cabin structure assembly, and the cross beam includes a cell pack mounting front beam, the cell pack mounting front beam is at a position at the top of the case body close to the front cabin structure assembly, and is connected to a rear of the front cabin structure assembly.

14. The cell-to-body structure according to embodiment 13, where the front cabin structure assembly includes a front panel, a connection flange is on the front panel, and a top of the cell pack mounting front beam is connected to the connection flange.

15. The cell-to-body structure according to embodiment 1, where the vehicle body further includes a rear floor assembly, and the cross beam includes a cell pack mounting rear beam, the cell pack mounting rear beam is at a position at the top of the case body close to the rear floor assembly, and the cell pack mounting rear beam is connected to a front of the rear floor assembly.

16. The cell-to-body structure according to embodiment 15, where the rear floor assembly includes two rear stringers and a rear floor front beam connected between front ends of the two rear stringers, front ends of the two rear stringers being in lap joint with the two sill beams respectively, a top of the cell pack mounting rear beam being connected to the rear floor front beam.

17. The cell-to-body structure according to embodiment 15, where the rear floor assembly further includes a rear floor between the two rear stringers, and the power cell pack further includes a cell manager mounting box, the cell manager mounting box is at the top of the case body and behind the cell pack mounting rear beam, and an opening for the cell manager mounting box to pass through is on the rear floor.

18. The cell-to-body structure according to any one of embodiments 1-17, where the case body includes a lower case and an upper cover plate, the upper cover plate covering the lower case, an accommodation space for accommodating a power cell being jointly delimited by the upper cover plate and the lower case, the cross beam being integrated at a top of the upper cover plate, mounting lugs being formed on an peripheral surface of the lower case, and including a front mounting lug in the front of the lower case, a rear mounting lug behind the lower case and side mounting lugs at a left side and a right side of the lower case, the side mounting lugs is connected to the cell pack mounting portions, and the cross beam is behind the front mounting lug and in the front of the rear mounting lug.

19. The cell-to-body structure according to any one of embodiments 1-18, where the vehicle body further includes a support bracket, one end of the support bracket being connected to the sill beams, and the other end of the support bracket being connected to the bottom of the case body.

20. A vehicle, including the cell-to-body structure, the cell-to-body structure including:
a vehicle body, which includes two sill beams, the two sill beams being arranged in a spaced manner in a left-right direction of a vehicle, and a cell pack mounting portion is on each of the sill beams; and
a power cell pack, which includes a cell pack case, the cell pack case including a case body and a cross beam, the case body being connected to the cell pack mounting portion, the cross beam extending in the left-right direction, being located between the two sill beams, being integrated at a top of the case body and being connected to the vehicle body, and the top of the case body being used as a floor panel of the vehicle.

What is claimed is:

1. A cell-to-body structure, comprising:
a vehicle body, which comprises two sill beams, the two sill beams being arranged in a spaced manner in a left-right direction of a vehicle, and a cell pack mounting portion is on each of the sill beams; and
a power cell pack, which comprises a cell pack case, the cell pack case comprising a case body and a cross beam, the case body being connected to the cell pack mounting portion, the cross beam extending in the left-right direction, being located between the two sill beams, being integrated at a top of the case body and being connected to the vehicle body, and the top of the case body being used as a floor panel of the vehicle;
wherein the cross beam comprises a seat beam, each of the sill beams comprises a sill beam body and a connection support integrated on the sill beam body, and two ends of the seat beam in the left-right direction are connected to the two connection supports respectively; and
wherein each of the sill beam bodies comprises a first portion and a second portion below the first portion, the first portion protruding out of the second portion towards a direction close to the seat beam, so as to form an accommodation space for accommodating the case body between the first portion and the second portion.

2. The cell-to-body structure according to claim 1, further comprising a sealing layer, wherein the sealing layer is used for sealing a gap between the top of the case body and the vehicle body.

3. The cell-to-body structure according to claim 2, wherein the sealing layer is an annular sealing layer, the cross beam is on an inner side of the annular sealing layer, and the cell pack mounting portions are on an outer side of the annular sealing layer.

4. The cell-to-body structure according to claim 2, wherein each of the sill beams comprises a sill beam body and a sealing plate formed on the sill beam body, the sealing plate is above the case body and extends towards a direction close to the cross beam, and part of the sealing layer is between the top of the case body and the sealing plate.

5. The cell-to-body structure according to claim 1, wherein the connection support is integrated on the first portion, and the seat beam is welded to the top of the case body.

6. The cell-to-body structure according to claim 1, wherein each of the second portions has a first upper force transfer portion and a first lower force transfer portion below the first upper force transfer portion, and the case body comprises a side frame stringer extending in a front-rear direction of the vehicle, the side frame stringer has a second upper force transfer portion and a second lower force transfer portion is below the second upper force transfer portion; and projections of the first upper force transfer portions in the left-right direction at least partially overlap a projection of the second upper force transfer portion in the left-right direction, projections of the first lower force transfer portions in the left-right direction at least partially overlap a projection of the second lower force transfer portion in the left-right direction, the second upper force transfer portion is capable of transferring an impact force to the top of the case body, and the second lower force transfer portion is capable of transferring an impact force to a bottom of the case body.

7. The cell-to-body structure according to claim 6, wherein the second upper force transfer portion comprises an upper force transfer rib, and the second lower force transfer portion comprises a lower force transfer rib, at least part of the upper force transfer rib extending obliquely upwards towards the top of the case body, and at least part of the lower force transfer rib extending obliquely downwards towards the bottom of the case body.

8. The cell-to-body structure according to claim 7, wherein the side frame stringer comprises a frame stringer body, the frame stringer body being hollow, and the upper force transfer rib and the lower force transfer rib are in the frame stringer body; the second upper force transfer portion further comprises a first side mounting lug on one side of the frame stringer body close to the second portion, and the second lower force transfer portion further comprises a second side mounting lug on one side of the frame stringer body close to the second portion, the first side mounting lug being connected to the first portion, and the second side mounting lug being connected to the second portion.

9. The cell-to-body structure according to claim 8, wherein at least one energy absorption cavity is in each of the first upper force transfer portion, that first lower force transfer portion, the first side mounting lug and the second side mounting lug.

10. The cell-to-body structure according to claim 6, wherein the side frame stringer and the second portion are in a spaced manner in the left-right direction to define impact buffer cavities.

11. The cell-to-body structure according to claim 1, wherein the vehicle body further comprises a front cabin structure assembly, and the cross beam comprises a cell pack mounting front beam, the cell pack mounting front beam is at a position at the top of the case body close to the front cabin structure assembly, and is connected to a rear of the front cabin structure assembly.

12. The cell-to-body structure according to claim 11, wherein the front cabin structure assembly comprises a front panel, a connection flange is on the front panel, and a top of the cell pack mounting front beam is connected to the connection flange.

13. The cell-to-body structure according to claim 1, wherein the vehicle body further comprises a rear floor assembly, and the cross beam comprises a cell pack mounting rear beam, the cell pack mounting rear beam is at a position at the top of the case body close to the rear floor assembly, and the cell pack mounting rear beam is connected to a front of the rear floor assembly.

14. The cell-to-body structure according to claim 13, wherein the rear floor assembly comprises two rear stringers and a rear floor front beam connected between front ends of the two rear stringers, front ends of the two rear stringers being in lap joint with the two sill beams respectively, a top of the cell pack mounting rear beam being connected to the rear floor front beam.

15. The cell-to-body structure according to claim 13, wherein the rear floor assembly further comprises a rear floor between the two rear stringers, and the power cell pack further comprises a cell manager mounting box, the cell manager mounting box is at the top of the case body and behind the cell pack mounting rear beam, and an opening for the cell manager mounting box to pass through is on the rear floor.

16. The cell-to-body structure according to claim 1, wherein the case body comprises a lower case and an upper cover plate, the upper cover plate covering the lower case; an accommodation space for accommodating a power cell being jointly delimited by the upper cover plate and the lower case; the cross beam being integrated at a top of the upper cover plate; mounting lugs being formed on an peripheral surface of the lower case and comprising a front mounting lug in the front of the lower case, a rear mounting lug behind the lower case and side mounting lugs at a left side and a right side of the lower case, the side mounting lugs are connected to the cell pack mounting portions, and the cross beam is behind the front mounting lug and in the front of the rear mounting lug.

17. The cell-to-body structure according to claim 1, wherein the vehicle body further comprises a support bracket, one end of the support bracket being connected to the sill beams, and the other end of the support bracket being connected to the bottom of the case body.

18. A vehicle, comprising a cell-to-body structure, the cell-to-body structure comprising:

a vehicle body, which comprises two sill beams, the two sill beams being arranged in a spaced manner in a left-right direction of a vehicle, and a cell pack mounting portion is on each of the sill beams; and a power cell pack, which comprises a cell pack case, the cell pack case comprising a case body and a cross beam, the case body being connected to the cell pack mounting portion, the cross beam extending in the left-right direction, being located between the two sill beams, being integrated at a top of the case body and being connected to the vehicle body, and the top of the case body being used as a floor panel of the vehicle;

wherein the cross beam comprises a seat beam, each of the sill beams comprises a sill beam body and a connection support integrated on the sill beam body, and two ends of the seat beam in the left-right direction are connected to the two connection supports respectively; and wherein each of the sill beam bodies comprises a first portion and a second portion below the first portion, the first portion protruding out of the second portion towards a direction close to the seat beam, so as to form an accommodation space for accommodating the case body between the first portion and the second portion.

* * * * *

UNITED STATES PATENT AND TRADEMARK OFFICE
CERTIFICATE OF CORRECTION

PATENT NO. : 12,420,622 B2  
APPLICATION NO. : 17/895457  
DATED : September 23, 2025  
INVENTOR(S) : Jiachun Qian Page 1 of 1

It is certified that error appears in the above-identified patent and that said Letters Patent is hereby corrected as shown below:

In the Claims

In Column 18, Line 1, in Claim 9, delete "that" and insert -- the --, therefor

Signed and Sealed this  
Second Day of December, 2025

John A. Squires  
*Director of the United States Patent and Trademark Office*